US012355532B2

(12) United States Patent
Jeon et al.

(10) Patent No.: US 12,355,532 B2
(45) Date of Patent: Jul. 8, 2025

(54) CSI REPORT FOR SPATIAL DOMAIN NETWORK ADAPTATION

(71) Applicant: Samsung Electronics Co., Ltd., Suwon-si (KR)

(72) Inventors: Jeongho Jeon, San Jose, CA (US); Aristides Papasakellariou, Houston, TX (US); Hongbo Si, Allen, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/363,704

(22) Filed: Aug. 1, 2023

(65) Prior Publication Data
US 2024/0063871 A1    Feb. 22, 2024

Related U.S. Application Data

(60) Provisional application No. 63/399,488, filed on Aug. 19, 2022.

(51) Int. Cl.
*H04B 7/06* (2006.01)
*H04W 72/23* (2023.01)

(52) U.S. Cl.
CPC ......... *H04B 7/0626* (2013.01); *H04B 7/0639* (2013.01); *H04W 72/23* (2023.01)

(58) Field of Classification Search
CPC ...... H04B 7/06; H04B 7/0613; H04B 7/0615; H04B 7/0619; H04B 7/0621; H04B 7/0626; H04B 7/0639; H04W 72/20; H04W 72/23
See application file for complete search history.

(56) References Cited

U.S. PATENT DOCUMENTS 8,948,293 B2 * 2/2015 Onggosanusi ........ H04W 72/23
375/284
9,843,423 B2 * 12/2017 Kang ................... H04B 7/0626
(Continued)

FOREIGN PATENT DOCUMENTS

WO      2022133358 A1    6/2022

OTHER PUBLICATIONS

International Search Report and Written Opinion issued Nov. 27, 2023 regarding International Application No. PCT/KR2023/012232, 7 pages.
(Continued)

*Primary Examiner* — James M Perez

(57) ABSTRACT

Methods and apparatuses for network operation adaptation in a spatial domain in a wireless communication system. A method for a user equipment (UE) to report channel state information (CSI) includes receiving: first information related to reception of CSI reference signals (CSI-RSs) on a cell, second information related to determining a first number of CSI reports respectively associated with a first number of operation states on the cell, third information related to triggering a second number CSI reports respectively associated with a second number of operation states from the first number of operation states, and the CSI-RSs based on the first information. An operation state is associated with a configuration for active antenna ports, antenna panels, or transmission reception points. The method further includes determining, based on the second information and the CSI-RSs, the second number of CSI reports and transmitting a channel with the second number of CSI reports.

20 Claims, 8 Drawing Sheets

(56) References Cited

U.S. PATENT DOCUMENTS

| | | | | |
|---|---|---|---|---|
| 9,866,303 B2* | 1/2018 | Ko | ............... | H04B 7/0626 |
| 9,867,060 B2* | 1/2018 | Inoue | ............... | H04B 7/0479 |
| 9,900,068 B2* | 2/2018 | Park | ............... | H04L 5/0057 |
| 9,967,013 B2* | 5/2018 | Kang | ............... | H04L 5/0048 |
| 10,033,447 B2* | 7/2018 | Onggosanusi | ....... | H04B 7/0691 |
| 10,056,956 B2* | 8/2018 | Rahman | ......... | H04B 7/0626 |
| 10,181,964 B2* | 1/2019 | Yum | ............... | H04B 17/345 |
| 10,574,308 B2* | 2/2020 | Wernersson | ......... | H04B 7/0479 |
| 10,862,557 B2* | 12/2020 | Liu | ............... | H04B 7/0486 |
| 10,917,149 B2* | 2/2021 | Han | ............... | H04B 7/0456 |
| 11,075,675 B2* | 7/2021 | Onggosanusi | ....... | H04B 7/0469 |
| 11,088,740 B2* | 8/2021 | Onggosanusi | ....... | H04B 7/0469 |
| 11,342,973 B1* | 5/2022 | Aldalbahi | ............ | H04B 7/0473 |
| 11,777,565 B2* | 10/2023 | Onggosanusi | ......... | H04B 7/024 375/284 |
| 11,825,466 B2* | 11/2023 | Zhou | ............... | H04W 72/121 |
| 2013/0039349 A1* | 2/2013 | Ebrahimi Tazeh Mahalleh ......... H04L 5/0048 370/336 |
| 2013/0083681 A1* | 4/2013 | Ebrahimi Tazeh Mahalleh ......... H04B 7/0626 370/252 |
| 2013/0242773 A1* | 9/2013 | Wernersson | ......... | H04B 7/0632 370/252 |
| 2013/0272151 A1* | 10/2013 | Thomas | ............... | H04L 5/0091 370/252 |
| 2013/0308715 A1* | 11/2013 | Nam | ............... | H04B 7/0634 375/267 |
| 2014/0016549 A1* | 1/2014 | Novlan | ............... | H04B 7/0479 370/328 |
| 2014/0098689 A1* | 4/2014 | Lee | ............... | H04W 24/08 370/252 |
| 2015/0236828 A1* | 8/2015 | Park | ............... | H04L 5/001 375/340 |
| 2015/0288499 A1* | 10/2015 | Nam | ............... | H04B 7/0647 370/329 |
| 2015/0341091 A1* | 11/2015 | Park | ............... | H04B 7/0456 375/267 |
| 2015/0341093 A1* | 11/2015 | Ji | ............... | H04B 7/0658 375/267 |
| 2015/0341099 A1* | 11/2015 | Kang | ............... | H04B 7/0634 375/267 |
| 2016/0028519 A1* | 1/2016 | Wei | ............... | H04B 7/0456 375/267 |
| 2016/0056875 A1* | 2/2016 | Kang | ............... | H04B 7/0469 370/329 |
| 2016/0080052 A1* | 3/2016 | Li | ............... | H04B 7/0632 375/267 |
| 2016/0080058 A1* | 3/2016 | Kang | ............... | H04B 7/0691 370/329 |
| 2016/0165466 A1* | 6/2016 | Kim | ............... | H04L 5/0057 370/252 |
| 2016/0192229 A1* | 6/2016 | Liu | ............... | H04B 7/065 455/423 |
| 2016/0212643 A1* | 7/2016 | Park | ............... | H04B 7/0478 |
| 2016/0344525 A1* | 11/2016 | Kang | ............... | H04L 5/0028 |
| 2016/0359538 A1* | 12/2016 | Onggosanusi | ....... | H04B 7/0478 |
| 2016/0373224 A1* | 12/2016 | Kim | ............... | H04L 27/261 |
| 2016/0380734 A1* | 12/2016 | Wang | ............... | H04L 5/0048 370/329 |
| 2017/0019159 A1* | 1/2017 | Vook | ............... | H04L 25/03898 |
| 2017/0070277 A1* | 3/2017 | Si | ............... | H04B 7/0626 |
| 2017/0195017 A1* | 7/2017 | Kim | ............... | H04B 7/0469 |
| 2017/0244533 A1* | 8/2017 | Onggosanusi | ....... | H04B 7/0478 |
| 2017/0279514 A1* | 9/2017 | Rahman | ............... | H04B 7/0478 |
| 2017/0310378 A1* | 10/2017 | Kim | ............... | H04B 7/04 |
| 2018/0006845 A1* | 1/2018 | Kim | ............... | H04B 7/06 |
| 2018/0034525 A1* | 2/2018 | Park | ............... | H04B 7/0456 |
| 2018/0041264 A1* | 2/2018 | Ko | ............... | H04B 7/0417 |
| 2018/0083681 A1* | 3/2018 | Faxér | ............... | H04B 7/0658 |
| 2018/0098234 A1* | 4/2018 | Kim | ............... | H04B 7/065 |
| 2018/0102817 A1* | 4/2018 | Park | ............... | H04B 7/0417 |
| 2018/0115357 A1* | 4/2018 | Park | ............... | H04W 72/00 |
| 2018/0123668 A1* | 5/2018 | Kwak | ............... | H04L 5/0023 |
| 2018/0152324 A1* | 5/2018 | Park | ............... | H04L 25/0224 |
| 2018/0351621 A1* | 12/2018 | Wei | ............... | H04B 7/063 |
| 2020/0127797 A1* | 4/2020 | Yoon | ............... | H04B 7/0413 |
| 2020/0382190 A1* | 12/2020 | Pawar | ............... | H04W 80/08 |
| 2021/0344397 A1* | 11/2021 | Lee | ............... | H04B 7/02 |
| 2022/0385344 A1* | 12/2022 | Großmann | ........... | H04B 7/0478 |
| 2023/0093335 A1* | 3/2023 | Harrison | ............... | H04B 7/0617 370/329 |
| 2023/0111063 A1* | 4/2023 | Ji | ............... | H04L 5/0057 370/329 |
| 2023/0209532 A1* | 6/2023 | Zhou | ............... | H04W 72/121 |
| 2024/0049214 A1* | 2/2024 | Zhou | ............... | H04W 72/121 |
| 2024/0063871 A1* | 2/2024 | Jeon | ............... | H04B 7/063 |
| 2024/0305434 A1* | 9/2024 | Rahman | ............... | H04B 7/0632 |

OTHER PUBLICATIONS

NTT Docomo, Inc., "Discussion on NW energy saving techniques", 3GPP TSG RAN WG1 #110, R1-2207419, Aug. 2022, 6 pages.

Nokia et al., "Network Energy Saving Techniques", 3GPP TSG RAN WG1 #110, R1-2206075, Aug. 2022, 13 pages.

Samsung, "Network energy saving techniques", 3GPP TSG RAN WG1 #110, R1-2206839, Aug. 2022, 15 pages.

Interdigital Inc., "Potential techniques for network energy saving", 3GPP TSG RAN WG1 #110, R1-2206666, Aug. 2022, 14 pages.

"5G; NR; Physical channels and modulation (3GPP TS 38.211 version 17.5.0 Release 17)", ETSI TS 138 211 V17.5.0, Jul. 2023, 141 pages.

"5G; NR; Multiplexing and channel coding (3GPP TS 38.212 version 17.5.0 Release 17)", ETSI TS 138 212 V17.5.0, Apr. 2023, 206 pages.

"5G; NR; Physical layer procedures for control (3GPP TS 38.213 version 17.6.0 Release 17)", ETSI TS 138 213 V17.6.0, Jul. 2023, 265 pages.

"5G; NR; Physical layer procedures for data (3GPP TS 38.214 version 17.6.0 Release 17)", ETSI TS 138 214 V17.6.0, Jul. 2023, 236 pages.

"5G; NR; Physical layer measurements (3GPP TS 38.215 version 17.3.0 Release 17)", ETSI TS 138 215 V17.3.0, Apr. 2023, 33 pages.

"5G; NR; Medium Access Control (MAC) protocol specification (3GPP TS 38.321 version 17.5.0 Release 17)", ETSI TS 138 321 V17.5.0, Jul. 2023, 255 pages.

"5G; NR; Radio Resource Control (RRC); Protocol specification (3GPP TS 38.331 version 17.5.0 Release 17)", ETSI TS 138 331 V17.5.0, Jul. 2023, 1304 pages.

"5G; NR; Requirements for support of radio resource management (3GPP TS 38.133 version 17.10.0 Release 17)", ETSI TS 138 133 V17.10.0, Jul. 2023, 4687 pages.

* cited by examiner

CSI REPORT FOR SPATIAL DOMAIN NETWORK ADAPTATION

CROSS-REFERENCE TO RELATED APPLICATIONS AND CLAIM OF PRIORITY

The present application claims priority to U.S. Provisional Patent Application No. 63/399,488, filed on Aug. 19, 2022. The contents of the above-identified patent document is incorporated herein by reference.

TECHNICAL FIELD

The present disclosure relates generally to wireless communication systems and, more specifically, the present disclosure relates to a channel state information (CSI) report for spatial domain network adaptation in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to CSI reporting for spatial domain network adaptation in a wireless communication system.

In one embodiment, a method for a user equipment (UE) to report CSI is provided. The method includes receiving: first information related to reception of CSI reference signals (CSI-RSs) on a cell, second information related to determining a first number of CSI reports respectively associated with a first number of operation states on the cell, third information related to triggering a second number CSI reports respectively associated with a second number of operation states from the first number of operation states, and the CSI-RSs based on the first information. An operation state from the first number of operation states is associated with a configuration for a set of active antenna ports, antenna panels, or transmission reception points (TRPs). The method further includes determining, based on the second information and the reception of the CSI-RSs, the second number of CSI reports and transmitting a channel with the second number of CSI reports.

In another embodiment, a UE is provided. The UE includes a transceiver configured to receive: first information related to reception of CSI-RSs on a cell, second information related to determining a first number of CSI reports respectively associated with a first number of operation states on the cell, third information related to triggering a second number of more than one CSI reports respectively associated with a second number of operation states from the first number of operation states, and the CSI-RSs based on the first information. An operation state from the first number of operation states is associated with a configuration for a set of active antenna ports, antenna panels, or TRPs. The UE further includes a processor operably coupled to the transceiver The processor is configured to determine, based on the second information and the reception of the CSI-RSs, the second number of CSI reports. The transceiver is further configured to transmit a channel with the second number of CSI reports.

In yet another embodiment, a base station is provided. The base station includes a transceiver configured to transmit first information related to reception of CSI-RSs on a cell; transmit second information related to a first number of CSI reports respectively associated with a first number of operation states on the cell; transmit third information related to triggering a second number of more than one CSI reports respectively associated with a second number of operation states from the first number of operation states; transmit the CSI-RSs based on the first information; and receive a channel with the second number of CSI reports. An operation state from the first number of operation states is associated with a configuration for a set of active antenna ports, antenna panels, or TRPs. The second number of CSI reports are based on the second information and the CSI-RSs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v17.5.0, "NR; Physical channels and modulation"; 3GPP TS 38.212 v17.5.0, "NR; Multiplexing and Channel coding"; 3GPP TS 38.213 v17.6.0, "NR; Physical Layer Procedures for Control"; 3GPP TS 38.214 v17.6.0, "NR; Physical Layer Procedures for Data"; 3GPP TS 38.215 v17.3.0, "NR; Physical layer measurements"; 3GPP TS 38.321 v17.5.0, "NR; Medium Access Control (MAC) protocol specification"; 3GPP TS 38.331 v17.5.0, "NR; Radio Resource Control (RRC) Protocol Specification"; and 3GPP TS 38.133 v17.10.0, "NR; Requirements for support of radio resource management."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
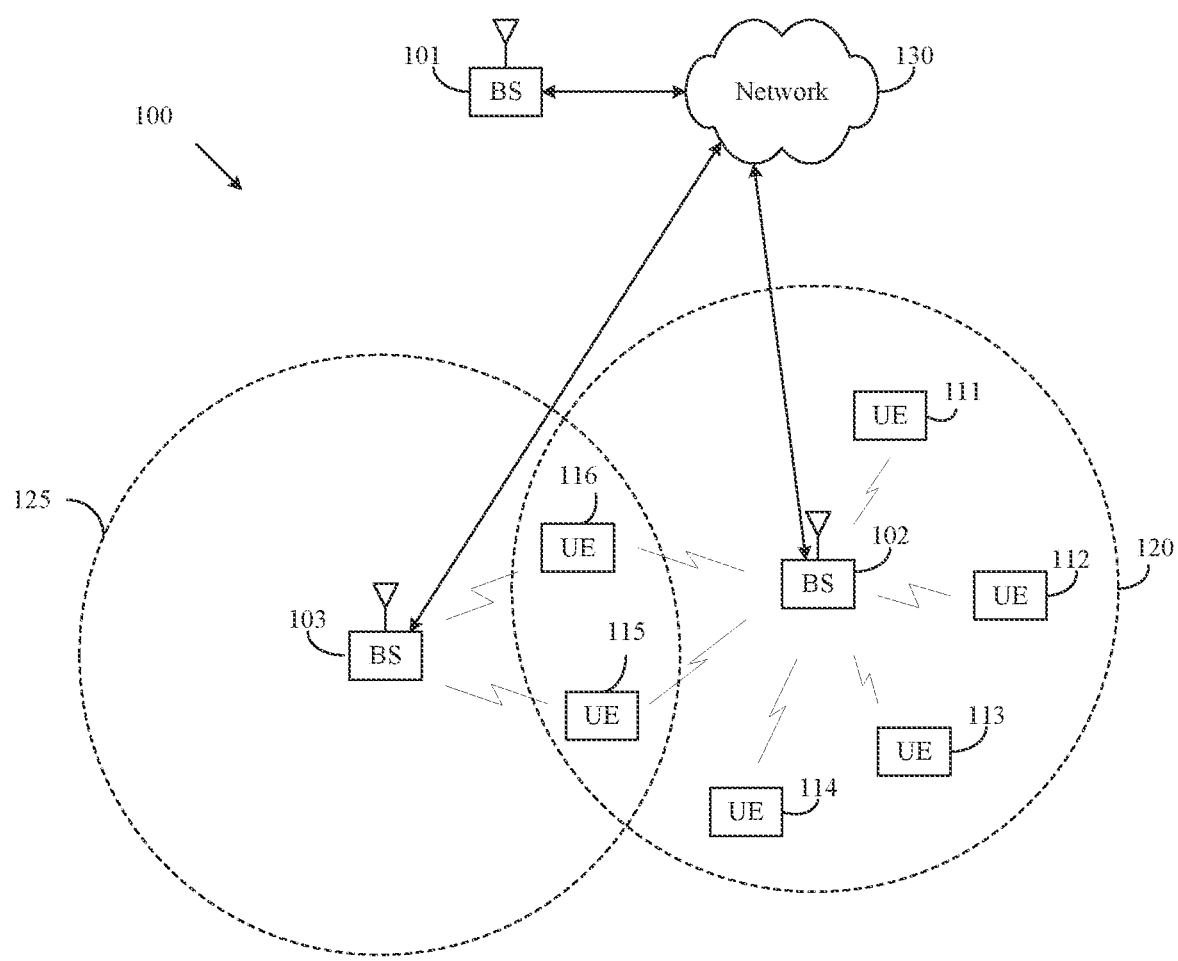
FIG. 1 illustrates an example of wireless network according to embodiments of the present disclosure.
Figure 2:
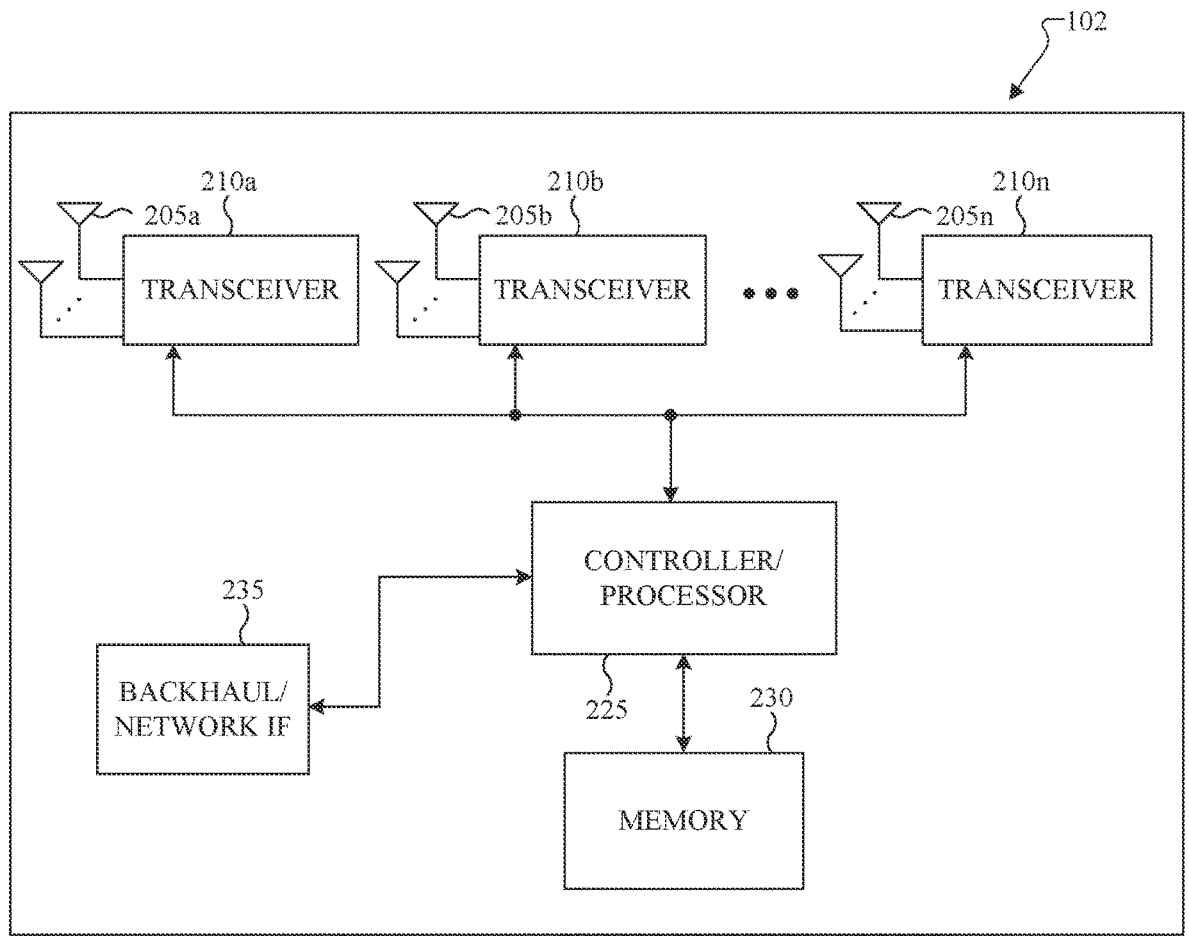
FIG. 2 illustrates an example of gNB according to embodiments of the present disclosure.
Figure 3:
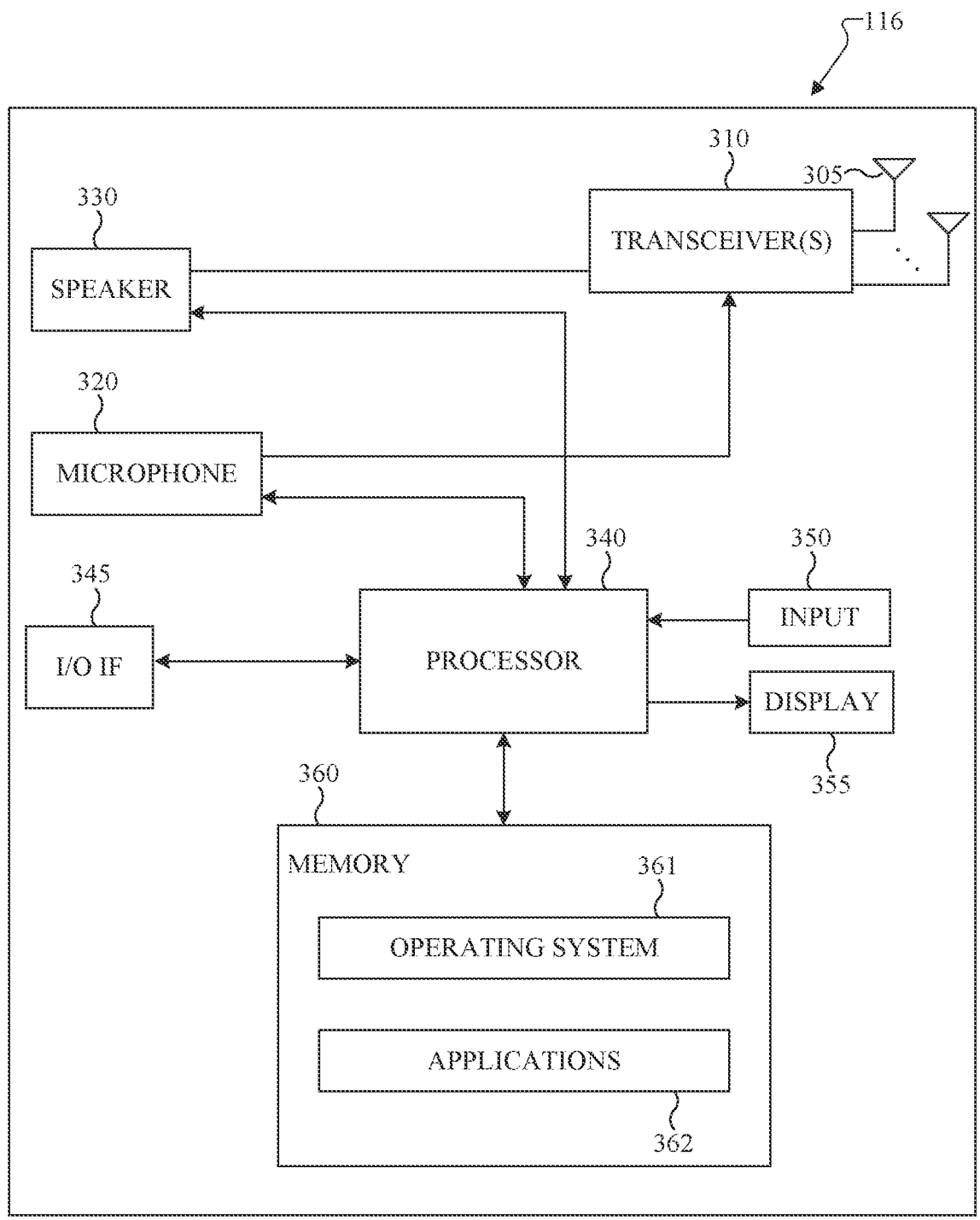
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for CSI reporting for spatial domain network adaptation in a wireless communication system. In certain embodiments, and one or more of the gNBs 101-103 includes circuitry, programming, or a combination thereof, for supporting CSI reporting for spatial domain network adaptation in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes to support CSI reporting for spatial domain network adaptation in a wireless communication system. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for CSI reporting for spatial domain network adaptation in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355*m* which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
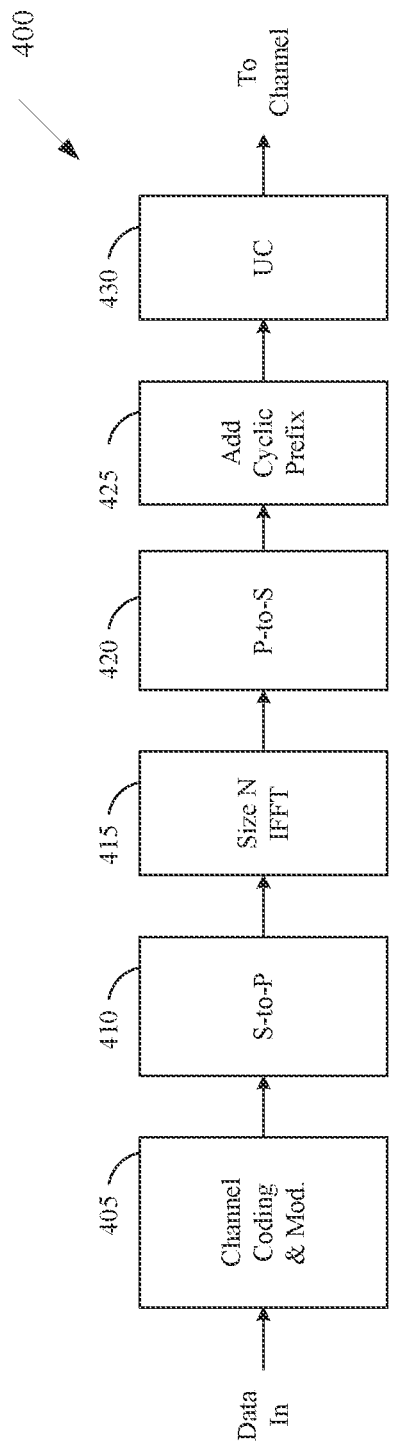
FIGS. 4 and 5 illustrate example of wireless transmit and receive paths according to this disclosure.
Figure 5:
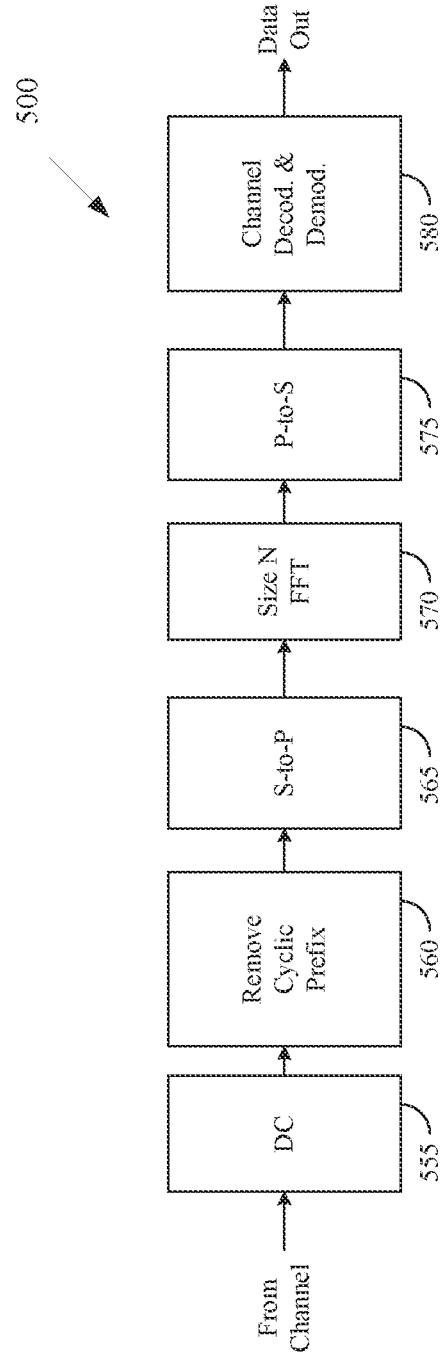

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support CSI reporting for spatial domain network adaptation in a wireless communication system.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a downconverter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

To enable digital precoding, efficient design of CSI-RS is a crucial factor. For this reason, three types of CSI reporting mechanism corresponding to three types of CSI-RS measurement behavior are supported in Rel.13 LTE: 1) "CLASS A" CSI reporting which corresponds to non-precoded CSI-RS, 2) "CLASS B" reporting with K=1 CSI-RS resource which corresponds to UE-specific beamformed CSI-RS, 3) "CLASS B" reporting with K>1 CSI-RS resources which corresponds to cell-specific beamformed CSI-RS. For non-precoded (NP) CSI-RS, a cell-specific one-to-one mapping between CSI-RS port and TXRU is utilized.

Here, different CSI-RS ports have the same wide beam width and direction and hence generally cell-wide coverage. For beamformed CSI-RS, beamforming operation, either cell-specific or UE-specific, is applied on a non-zero-power (NZP) CSI-RS resource (consisting of multiple ports). Here, (at least at a given time/frequency) CSI-RS ports have narrow beam widths and hence not cell-wide coverage, and (at least from the eNB perspective) at least some CSI-RS port-resource combinations have different beam directions. The basic principle remains the same in NR.

In scenarios where DL long-term channel statistics can be measured through UL signals at a serving gNB, UE-specific beamformed CSI-RS can be readily used. This is typically feasible when UL-DL duplex distance is sufficiently small. When this condition does not hold, however, some UE feedback is necessary for the gNB to obtain an estimate of DL long-term channel statistics (or any of its representation thereof). To facilitate such a procedure, a first beamformed CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

One of the key components of a MIMO transmission scheme is the accurate CSI acquisition at the gNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from gNB, and CSI acquisition and feedback from UE. In LTE up to Rel. 13, for FDD systems, the CSI feedback framework is "implicit" in the form of CQI/PMI/RI (and CRI in Rel. 13) derived from a codebook assuming SU transmission from eNB. Because of the inherent SU assumption while deriving CSI, this implicit CSI feedback is inadequate for MU transmission. On the other hand, NR system has been designed to be more MU-centric from a first release with high resolution Type-II codebook in addition to low resolution Type-I codebook.

Among various higher layer signaling from serving gNB to UE, a set of IEs related to this disclosure are described in the following.

To configure codebooks of Type-I and Type-II to a UE by the serving gNB using a higher layer signaling, the IE CodebookConfig is used.

codebookType includes type1, type2 and possibly sub-types such as typeI-SinglePanel, typeI-MultiPanel, typeII, and typeII-PortSelection, and corresponding parameters for each type.

n1-n2 is used to configure the number of antenna ports in first (n1) and second (n2) dimension and codebook subset restriction for typeI-SinglePanel.

ng-n1-n2 is used to configure the number of antenna panels (ng), the number of antenna ports in first (n1) and second (n2) dimension assuming that the antenna structure is identical for the configured number of panels, and codebook subset restriction for Type I Multi-panel codebook.

n1-n2-codebookSubsetRestriction is used to configure the number of antenna ports in first (n1) and second (n2) dimension and codebook subset restriction for typeII.

CodebookConfig-r17 includes typeI-SinglePanel1-r17 and typeI-SinglePanel2-r17 for type1. This is to allow configuring different antenna structures for two TRPs.

To indicate the resource element mapping of a CSI-RS resource in time- and frequency domain, the IE CSI-RS-ResourceMapping is used. The container includes elements for time- and frequency domain resource configuration such as firstOFDMSymbolInTimeDomain, firstOFDMSymbolIn-TimeDomain2, and frequencyDomainAllocation, the CSI-RS density, density, the number of ports, nrofPorts, among others. The IE CSI-RS-ResourceMapping comprises the NZP-CSI-RS-Resource and ZP-CSI-RS-Resource configurations, which are included in the CSI-ResourceConfig. The IE CSI-ResourceConfig defines a group of one or more NZP-CSI-RS-ResourceSet, CSI-IM-ResourceSet and/or CSI-SSB-ResourceSet. The IE CSI-ReportConfig is used to indicate to the UE a periodic or semi-persistent report sent on physical uplink control channel (PUCCH) on the cell in which the CSI-ReportConfig is included, or to indicate a semi-persistent or aperiodic report sent on physical uplink shared channel (PUSCH) triggered by DCI received on the cell in which the CSI-ReportConfig is included. The CSI-ReportConfig is set for certain CSI-ResourceConfigId for channel/interference measurements. The aforementioned CodebookConfig is also part of CSI-ReportConfig.

Present networks have limited capability to adapt an operation state in one or more of time/frequency/spatial/ power domains. For example, in NR, there are transmissions or receptions by a serving gNB that are expected by UEs, such as transmissions of synchronization signal/physical broadcast channels (SSBs) or system information or of CSI-RS indicated by higher layers, or receptions of physical random access channel (PRACH) or sounding reference signal (SRS) indicated by higher layers. Reconfiguration of a NW operation state involves higher layer signaling by a system information block (SIB) or by UE-specific RRC. That is a slow process and requires substantial signaling overhead, particularly for UE-specific RRC signaling. For example, it is currently not practical or possible for a network in typical deployments to enter an energy saving state where the network does not transmit or receive due to low traffic as, in order to obtain material energy savings, the network needs to suspend transmissions or receptions for several tens of milliseconds and preferably for even longer time periods. A similar inability exists for suspending transmission or receptions for shorter time periods as a serving gNB may need to transmit SSBs every 5 msec and, in TDD systems with UL-DL configurations having few UL symbols in a period, the serving gNB may need to receive PRACH or SRS in most UL symbols in a period.

Due to the above reasons, adaptation of a NW operation state is typically over long time periods, such as for off-peak hours when an amount of served traffic is small and for peak hours when an amount of served traffic is large. Therefore, a capability of a gNB to improve service by fast adaptation of a NW operation state to the traffic types and load, or to save energy by switching to a state that requires less energy consumption when an impact on service quality may be limited or none, is currently limited as there are no procedures for a serving gNB to perform fast adaptation of a NW operation state, with small signaling overhead, while simultaneously informing all UEs.

It is also beneficial to support a gradual transition of NW operation states between a maximum state where the NW operates at its maximum capability in one or more of a time/frequency/spatial/power domain and a minimum state where the NW operates at its minimum capability, or the NW enters a sleep mode. That may allow continuation of service while the NW transitions from a state with larger utilization of time/frequency/spatial/power resources to a state with lower utilization of such resources and the reverse as UEs can obtain time/frequency synchronization and automatic gain controller (AGC) alignments, perform measurements and provide CSI reports or transmit SRS prior to scheduling of physical downlink shared channel (PDSCH) receptions or PUSCH transmissions.

As one method to adapt network operation states, the gNB may turn off a subset of antenna ports in one network operation state. In order for a UE to properly measure CSI-RS and send the CSI report, there is a need to indicate to the UE the corresponding antenna structure, codebook subset restriction, and/or rank restriction when a subset of antenna ports is turned off.

As another method to adapt network operation states, the gNB may turn off a subset of antenna panels in one network operation state. In order for a UE to properly measure CSI-RS and send the CSI report, there is a need to indicate to the UE the corresponding set of active antenna panels, codebook subset restriction, and/or rank restriction. There is another need to define UE behavior on sending CSI report when it becomes a fallback to a single panel case.

As another method to adapt network operation states, the gNB may turn off a subset of TRPs in one network operation state. In order for a UE to properly measure CSI-RS and send the CSI report, there is a need to indicate to the UE the corresponding set of active TRPs.

There is another need to define fields of a DCI format supporting functionalities and procedures for adaptation of NW operation states in a spatial domain and to indicate a subset of active antenna ports, panels, and/or TRPs, and corresponding codebook subset and/or rank restrictions.

The present disclosure relates to a communication system. The present disclosure relates to defining functionalities and procedures for CSI report for spatial domain network adaptation.

The present disclosure further relates to indicating a UE a list of parameters related to CSI codebook including a subset of active antenna ports, panels, and/or TRPs, and corresponding codebook subset and/or rank restrictions.

The present disclosure also relates to fields of a DCI format supporting functionalities and procedures for CSI report for spatial domain network adaptation.

The present disclosure further relates to enabling a UE to receive a PDCCH providing a DCI format that indicates trigger states, which defines a subset of active antenna ports, panels, and/or TRPs, for CSI report.

Embodiments of the disclosure for CSI report for spatial domain network adaptation, such as for example for supporting network energy savings, are summarized in the following and are fully elaborated further below.

Method and apparatus for indicating parameters related to CSI codebook including a set of active antenna ports, panels, and/or TRPs, and corresponding codebook subset and/or rank restrictions.

Method and apparatus for triggering CSI report for spatial domain network adaptation via physical layer signaling, such as by DCI provided by a PDCCH, indicating a set of active antenna ports, panels, and/or TRPs.

Method and apparatus for a UE to provide a CSI report according to spatial domain network adaptation hypotheses such as by turning on/off a subset of antenna ports, panels, and/or TRPs.

For brevity, a DCI format that provides indication of NW operation states is referred to as DCI format 2_8 in the disclosure.

The general principle for adaptation of NW operation states by physical layer signaling includes a serving gNB indicating to a UE a set of NW operation states by higher layer signaling, such as by a SIB or UE-specific RRC signaling, and transmitting a PDCCH that provides a DCI format (e.g., a new DCI format 2_8) indicating an index to the set of NW operation states for the UE to determine an update of NW operation states.

Figure 6:
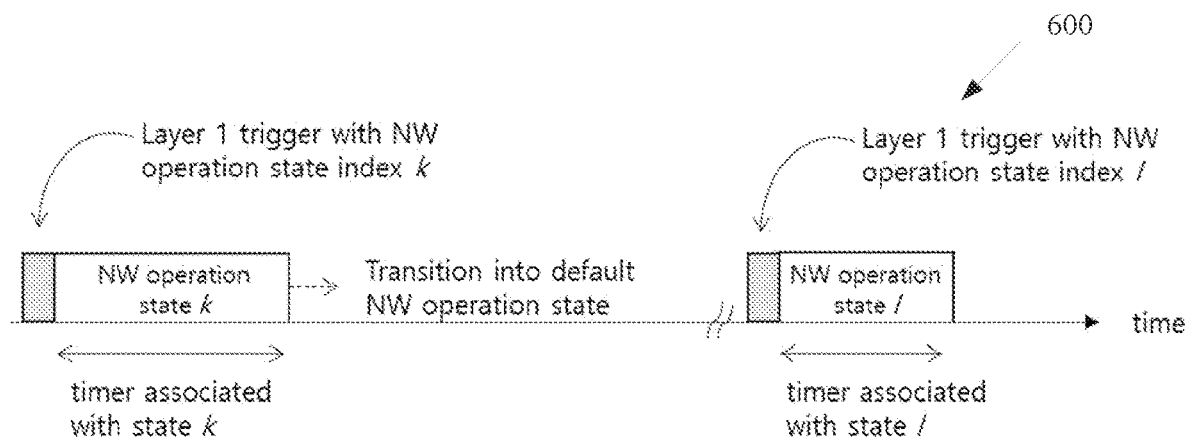
FIG. 6 illustrates an example of timing diagram of NW operation state transition according to embodiments of the present disclosure.

FIG. 6 illustrates an example of timing diagram of NW operation state transition 600 according to embodiments of the present disclosure. An embodiment of the timing diagram of NW operation state transition 600 shown in FIG. 6 is for illustration only.

FIG. 6 illustrates an example procedure for a NW operation state transition among different NW operation states according to the disclosure.

A NW transitions from a first NW operation state, denoted as state k, to a second NW operation state, denoted as state l. For example, each NW operation state may represent a light/mid/heavy NW energy saving (ES) mode by the NW using different ES methods and parameter configurations. A serving gNB can provide to a UE parameters for each index of a NW operation state and corresponding values for the parameters in a SIB or via UE-specific higher layer signaling. A UE can then identify a NW operation state based on an indicated value of the NW operation state index.

In one embodiment, the NW indicates to a UE a set of multiple NW operation states that can include a default state. A NW operation state can include parameters associated with transmission/reception by the network in one or more of a power, spatial, time, or frequency domain and corresponding IEs.

For example, in power domain, a first NW operation state can be associated with a first value of parameter ss-PBCH-BlockPower providing an average energy per resource element (EPRE) with secondary synchronization signals (SSS) in dBm, and a second NW operation state can be associated with a second value of a parameter ss-PBCH-BlockPower. For example, first and second NW operation states can be respectively associated with first and second values of parameter powerControlOffsetSS that provides a power offset (in dB) of non-zero power (NZP) CSI-RS RE to SSS RE. For example, first and second NW operation states can be respectively associated with first and second values of parameter powerControlOffset that provides a power offset (in dB) of PDSCH RE to NZP CSI-RS RE.

For example, in frequency domain, the first and second NW operation states can be respectively associated with the first and second values of a parameter locationAndBandwidth that indicates a frequency domain location and a bandwidth for receptions or transmissions by UEs. For example, first and second NW operation states can be respectively associated with first and second values of a list of serving cells for active transmission and reception.

For example, in spatial domain, the first and second NW operation states can be respectively associated with the first and second values of a parameter maxMIMO-Layers that indicates a maximum number of MIMO layers to be used for PDSCH receptions by a UE in the associated active DL BWP, or with first and second values of a parameter nrOfAntennaPorts that indicates a number of antenna ports to be used for codebook determination for PDSCH receptions, or with first and second values of a parameter activeCoresetPoolIndex that coresetPoolIndex values for PDCCH transmissions in corresponding CORESETs and UEs can skip PDCCH receptions in a CORESET with coresetPoolIndex value that is not indicated by activeCoresetPoolIndex. For example, first and second NW operation states can be respectively associated with first and second values of an antenna port subset that indicates a list of active antenna ports for CSI calculation and other associated parameters such as codebook subset restriction, rank restriction, the logical antenna size in two-dimension, number of antenna ports, and a list of CSI-RS resources, etc.

For example, in time domain, the first and second NW operation states can be respectively associated with the first and second values of a parameter ssb-PeriodicityServingCell that indicates a transmission periodicity in milliseconds for SSBs, or with first and second values of a parameter ssb-PositionsInBurst that indicates time domain positions of SSBs in a SSB transmission burst, or with first and second values of a parameter groupPresence that indicates groups of SSBs, such as groups of eight SSBs with consecutive indexes, that are transmitted, or with first and second values of a parameter inOneGroup that indicates the time domain positions of SSBs in a group, such as eight SSBs with consecutive indexes in a group, that are transmitted. For example, first and second NW operation states can be respectively associated with first and second values of a time pattern, e.g., in terms of periodicity, on-duration, start offset, etc., that indicates cell discontinuous transmission (DTX) or cell DRX.

A serving gNB can provide a UE one or more search space sets to monitor PDCCH for detection of a DCI format (e.g., a new DCI format 2_8) that indicates NW operation states as described in the subsequent embodiments of the disclosure. The search space sets can be separate from other search space sets that the serving gNB provides to the UE or some or all search space sets can be common and the UE can monitor PDCCH for the detection of both the DCI format that indicates NW operation states (e.g., a new DCI format 2_8) and for other DCI formats providing information for scheduling PDSCH receptions or PUSCH transmissions or SRS transmissions, or providing other control information for the UE to adjust parameters related to transmissions or receptions. The search space sets can be common search space (CSS) sets or UE-specific search space (USS).

When the search space sets are CSS sets, a serving gNB can indicate the search space sets associated with the DCI format (e.g., a new DCI format 2_8) through higher layer signaling in a SIB or through UE-specific RRC signaling. A UE can monitor PDCCH for detection of DCI format (e.g., a new DCI format 2_8) both in the RRC_CONNECTED state and in the RRC_INACTIVE state according to the corresponding search space sets and DRX operation may not apply for PDCCH receptions that provide the DCI format (e.g., a new DCI format 2_8).

A UE can receive PDCCHs providing the DCI format (e.g., a new DCI format 2_8) in an active DL BWP. Alternatively, a UE can receive PDCCHs providing the DCI format (e.g., a new DCI format 2_8) in an initial DL BWP that was used by all UEs to perform initial access and establish RRC connection with a serving gNB. The latter option enables a single PDCCH transmission with the DCI format (e.g., a new DCI format 2_8) from the serving gNB to all UEs because the initial DL BWP is common to all UEs, while the former option avoids a BWP switching delay because a UE receives PDCCHs providing the DCI format (e.g., a new DCI format 2_8) in the active DL BWP. It is also possible that the serving gNB indicates the DL BWP for PDCCH receptions that provide the DCI format (e.g., a new DCI format 2_8) through higher layer signaling, for example in a SIB.

Figure 7:
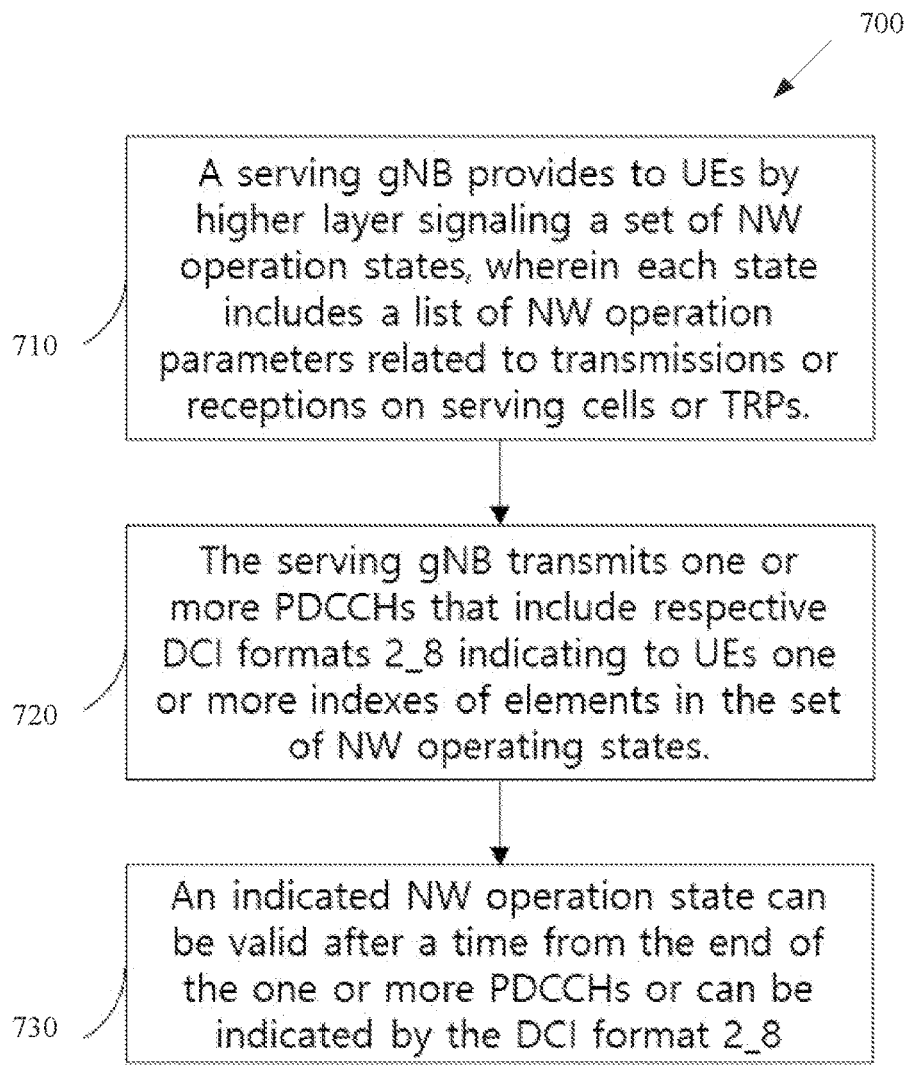
FIG. 7 illustrates a flowchart of NW procedure to indicate and activate NW operation states according to embodiments of the present disclosure.

FIG. 7 illustrates a flowchart of NW procedure 700 to indicate and activate NW operation states according to embodiments of the present disclosure. The NW procedure 700 as may be performed by a BS (e.g., 101-103 as illustrated in FIG. 1). An embodiment of the NW procedure 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

FIG. 7 illustrates an example procedure for a serving gNB to indicate to UE a NW operation state according to the disclosure.

A serving gNB provides to UEs by higher layer signaling a set of NW operation states, wherein each state includes a list of NW operation parameters related to transmissions or receptions on serving cells for example in one or more of time, frequency, spatial, or power domains 710. The higher layer signaling can be via a SIB and provided, for example, by ServingCellConfigCommonSIB, or can be UE-specific RRC signaling and provided, for example, by ServingCellConfigCommon. The serving gNB transmits one or more PDCCHs that include respective DCI formats (e.g., a new DCI format 2_8) indicating to UEs one or more indexes of elements in the set of NW operating states 720. An indicated NW operation state can be valid after a time from the end of the one or more PDCCHs that can be predefined in the specifications of the system operation or can be indicated by the DCI format (e.g., a new DCI format 2_8) 730.

The serving gNB can also provide to UEs by higher layer signaling a set of one or more timer values. The timer values can be in absolute time, such as milliseconds, or in a number of symbols, slots, or subframes based on a numerology/SCS of the active DL BWP or of a reference DL BWP, such as the initial DL BWP, on the primary cell or based on a reference numerology/SCS. If the set includes more than one timer values, the DCI format (e.g., a new DCI format 2_8) can also indicate a timer value. After the timer expires before the serving gNB transmits another PDCCH with the DCI format (e.g., a new DCI format 2_8) to indicate another NW operation state, the NW operation state becomes a default one that can be provided by higher layer signaling, or becomes a predetermined state from the set of NW operation states such as the first state or the last state.

Figure 8:
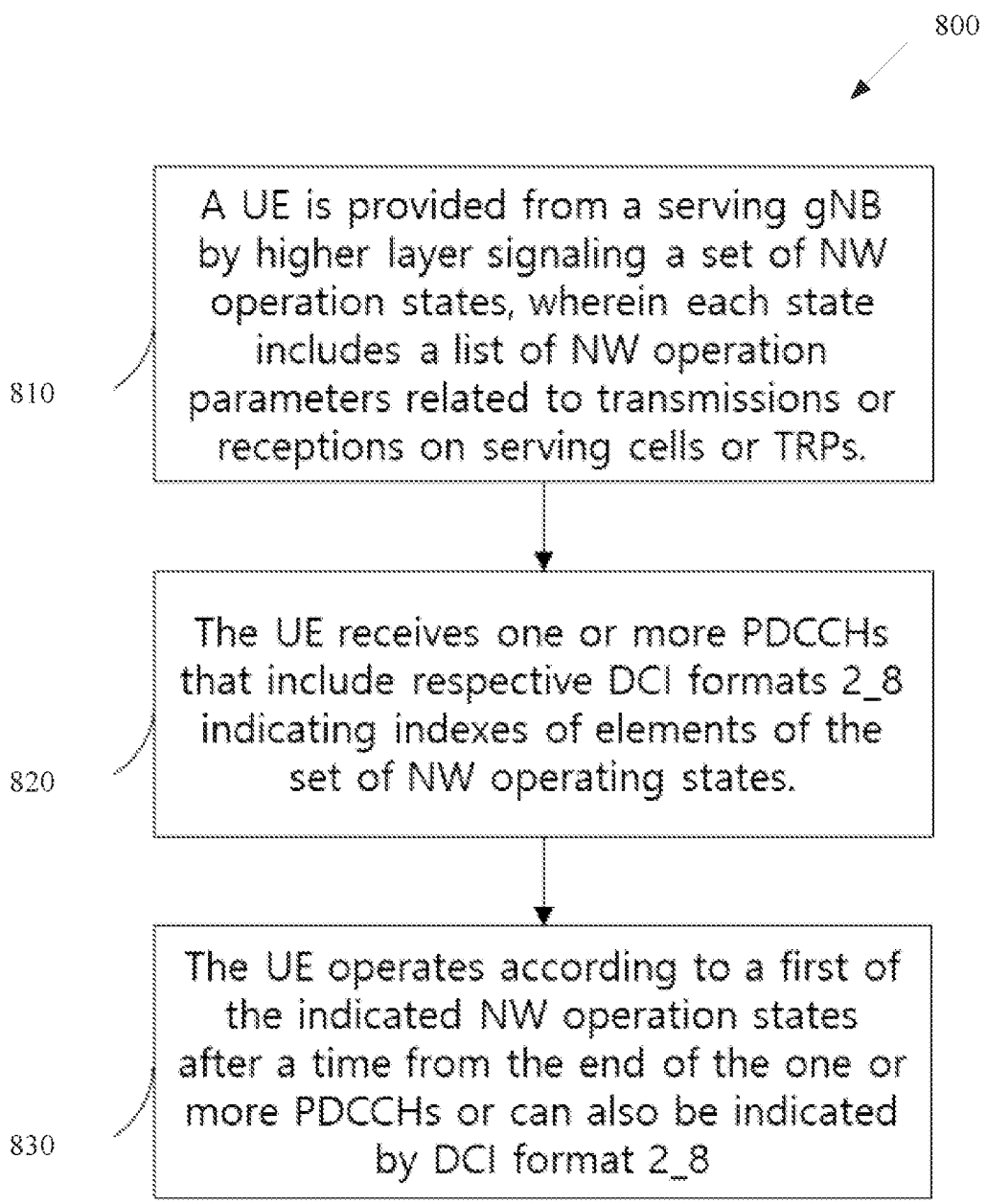
FIG. 8 illustrates a flowchart of UE procedure to receive and activate NW operation states according to embodiments of the present disclosure.

FIG. 8 illustrates a flowchart of UE procedure 800 to receive and activate NW operation states according to embodiments of the present disclosure. The UE procedure 800 as may be performed by a UE (e.g., 111-116 as illustrated in FIG. 1). An embodiment of the UE procedure 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

FIG. 8 illustrates an example procedure for a UE to obtain an indication of NW operation states from a DCI format according to the disclosure.

A UE is provided from a serving gNB by higher layer signaling a set of NW operation states, wherein each state includes a list of NW operation parameters related to transmissions or receptions on serving cells or TRPs for example in one or more of time, frequency, spatial, or power domains 810. The higher layer signaling can be a SIB and be provided, for example, by ServingCellConfigCommonSIB, or can be UE-specific RRC signaling and be provided, for example, by ServingCellConfigCommon. The UE receives one or more PDCCHs that include respective DCI formats (e.g., a new DCI format 2_8) indicating indexes of elements of the set of NW operating states 820. The UE operates according to a first of the indicated NW operation states after a time from the end of the one or more PDCCHs that can be predefined in the specifications of the system operation or can also be indicated by the DCI format (e.g., a new DCI format 2_8) 830.

The UE can also be provided by higher layer signaling from the serving gNB a set of one or more timer values that can be in absolute time, such as milliseconds, or in a number of symbols, slots, or subframes based on a numerology/SCS of the active DL BWP or of a reference DL BWP such as the initial DL BWP, on the primary cell, or based on a reference numerology/SCS such as 15 kHz. If the set of timer values includes more than one timer value, the DCI format (e.g., a new DCI format 2_8) can also indicate the timer value. If the UE does not receive another PDCCH with DCI format (e.g., a new DCI format 2_8) that indicates another NW operation state and the timer expires, the UE can assume operation according to a NW operation state that can be a default one that is provided by higher layer signaling, or can be a predetermined state from the set of NW operation states such as the first state or the last state.

Figure 9:
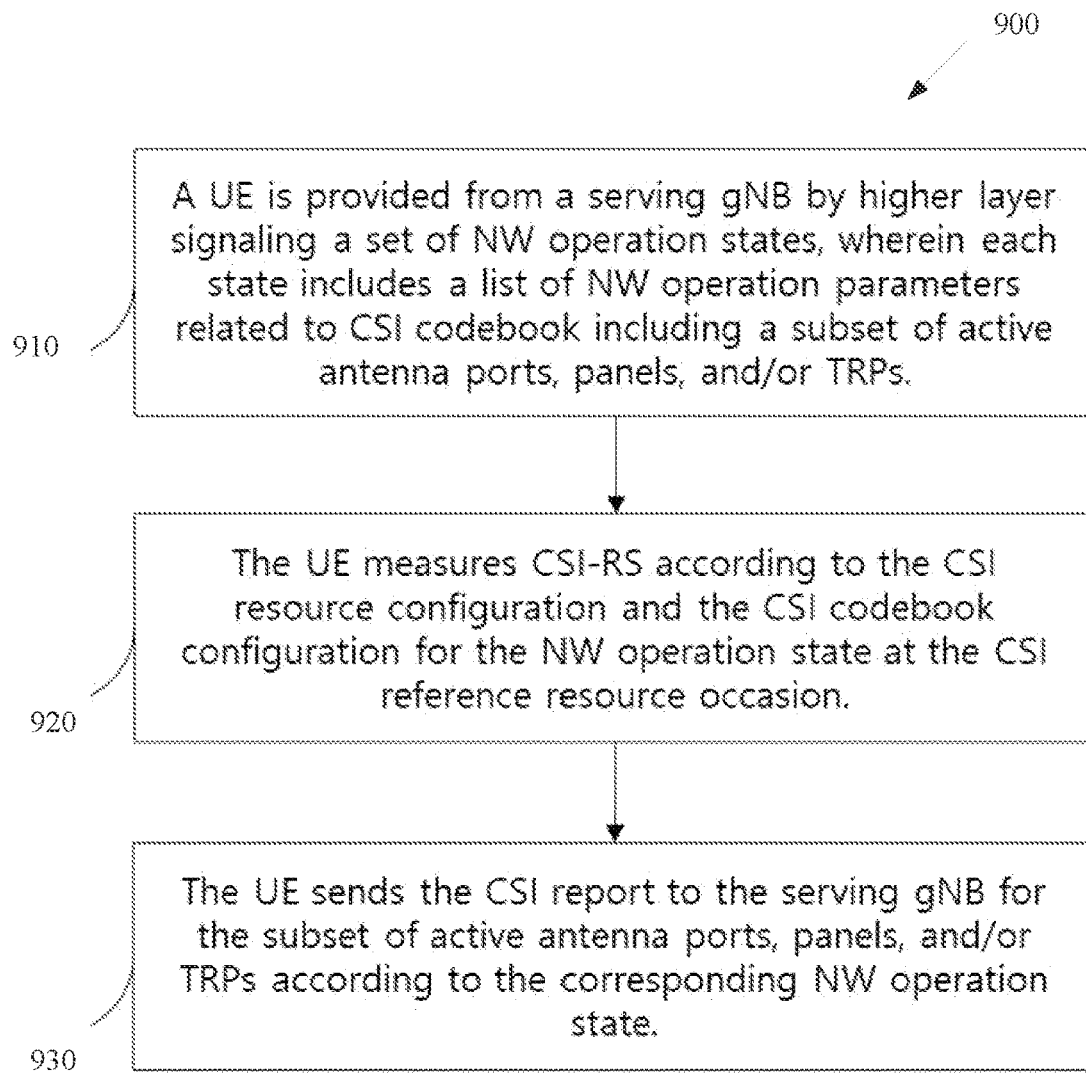
FIG. 9 illustrates a flowchart of UE procedure to provide CSI report for spatial domain network adaptation according to embodiments of the present disclosure.

FIG. 9 illustrates a flowchart of UE procedure 900 to provide CSI report for spatial domain network adaptation according to embodiments of the present disclosure. The UE procedure 900 as may be performed by a UE (e.g., 111-116 as illustrated in FIG. 1). An embodiment of the UE procedure 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

FIG. 9 illustrates an example procedure for a NW to provide and for a UE to obtain an indication on parameters related to CSI codebook including a set of active antenna ports, panels, and/or TRPs, and for the UE to perform CSI-RS measurements and provide reports according to the disclosure. As the NW switches its operation state from one to another, as previously described, the UE is provided from a serving gNB by a higher layer signaling a set of NW operation states and the serving gNB indicates to the UE a NW operation state transition via DCI, MAC CE, UE-specific RRC or a SIB.

In one method to adapt network operation states, the gNB may turn off a subset of antenna ports, panels, and/or TRPs in one network operation state and turn the subset, or a different subset, back on in another network operation state. A UE is provided from a serving gNB by a higher layer signaling a set of NW operation states, wherein each state includes a list of parameters related to a CSI codebook construction including a set of active antenna ports, panels, and/or TRPs 910.

The UE may be indicated more than one codebookConfig configurations or a codebookConfig configuration with more than one spatial domain adaptations according to the NW operation states. If the UE is indicated by higher layer signaling to provide a periodic or semi-persistent CSI report in a PUCCH, or if the UE is triggered by a DCI format to provide an aperiodic CSI report in a PUSCH or PUCCH, the UE performs corresponding measurements based on NZP CSI-RS resources for the active antenna ports/panels/TRPs according to the NZP CSI-RS resource configuration and the CSI codebook configuration for the NW operation state at the occasion of CSI reference resource 920. The UE then provides the CSI report to the serving gNB for the set of active antenna ports, panels, and/or TRPs according to the corresponding NW operation state at the occasion of CSI reference resource 930.

Figure 10:
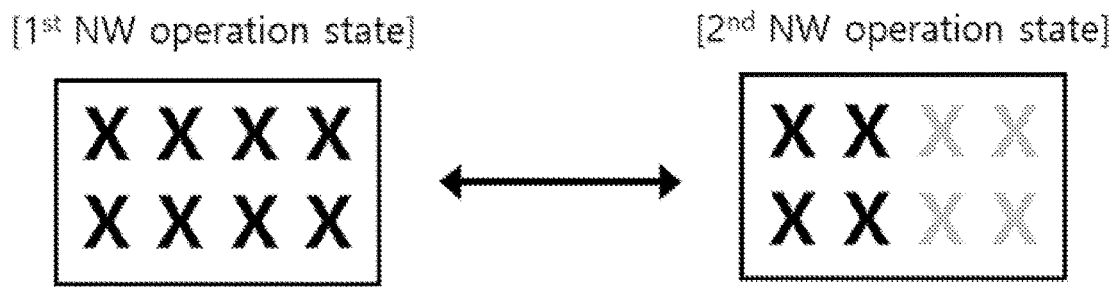
FIG. 10 illustrates an example of spatial domain adaptation hypotheses for CSI reporting via active antenna port indication according to embodiments of the present disclosure.

FIG. 10 illustrates an example of spatial domain adaptation hypotheses for CSI reporting via active antenna port indication 1000 according to embodiments of the present disclosure. An embodiment of spatial domain adaptation hypotheses for CSI reporting via active antenna port indication 1000 shown in FIG. 10 is for illustration only.

FIG. 10 illustrates an example diagram of spatial domain adaptation hypotheses for CSI reporting via active antenna port indication. In one embodiment, the UE is indicated by the serving gNB the antenna structure when all the antenna ports are turned on and one or multiple antenna structures when a subset of ports are turned off. Such indication may be included in the IE CodebookConfig or in an IE for NW operation state configuration. For Type-I single panel codebook, the UE can be signaled from the serving gNB one or multiple n1-n2 indications, each corresponding to different NW operation states, in the CodebookConfig along with codebook subset restriction indication for each NW operation state.

For the example diagram in FIG. 10, four-two-TypeI-SinglePanel-Restriction can be chosen and signaled to the UE for the first NW operation state and two-two-TypeI-SinglePanel-Restriction can be chosen and signaled to the UE for the second NW operation state. Also, one or more of typeI-SinglePanel-ri-Restriction can be signaled to the UE to indicate rank restriction for different NW operation states. For Type-II codebook, the UE can be signaled from the serving gNB one or multiple n1-n2-codebookSubsetRestriction and typeII-RI-Restriction indications, each corresponding to different NW operation states, which can be similarly understood as previously described for Type-I single panel codebook case. In addition, one or more of nrofPorts in CSI-RS-ResourceMapping can be signaled to the UE for different NW operation states. As the UE receives indication from the serving gNB to switch the NW operation state from one state to another state, the UE assumes a set of active antenna ports and corresponding antenna structure, codebook subset and/or rank restrictions according to the parameters for the next NW operation state to transition to.

Alternatively, a UE can receive from the serving gNB a PDCCH that provides a DCI format (e.g., a new DCI format 2_8) indicating the number of active antenna ports, the active antenna structure in terms of n1 and n2, or the active antenna structure in terms of an index from a set of predefined antenna structures signaled by higher layers or defined by specifications.

If the total number of active antenna ports is indicated by a DCI format (e.g., a new DCI format 2_8), there could be certain restrictions on the possible switching of the antenna structure such that the UE can assume a proper antenna structure accordingly. As an example, for a given antenna structure signaled for the first or the default NW operation state assuming that all the antenna ports are active, the switching of the antenna structure due to antenna port on/off could be such that the antenna size cannot increase in either first or second dimension and the antenna structure may result in a possible configuration allowed by the specification.

As an example, the following list describes possible switching of the antenna structure: (1) sixteen-one→twelve-one→eight-one→six-one→four-one→two-one→one-one; (2) eight-two→six-two→four-two→three-two→two-two→two-one→one-one; and (3) four-four→four-three-→four-two→three-two→two-two→two-one→one-one.

In the above list, one-one is a fallback to the single cross-pol antenna case. As an example, if the UE is indicated from the serving gNB by a higher layer signaling that the antenna structure for the first or the default NW operation state is six-two, then the possible antenna structure in any NW operation state can be among the set {six-two, four-two, three-two, two-two, two-one, one-one}. Therefore, if the UE is indicated from the serving gNB by a DCI format (e.g., a new DCI format 2_8) that the number of active antenna ports is eight in some NW operation state, the UE assumes that the antenna structure is four-two without any confusion with other possible structures such as eight-one.

If the total number of antenna ports indicated to the UE by the serving gNB for the first or default NW operation state or the maximum possible number of antenna ports that can be configured to the UE by specification is N, the number of active antenna ports can be signaled to the UE using a field of ceil($\log_2$(N)) bits in a DCI format (e.g., a new DCI format 2_8). Alternatively, only the index from the possible antenna configurations can be signaled in a DCI format (e.g., a new DCI format 2_8) with a smaller number of bits. For instance, as described in the above lists, the possible switching of antenna structure is limited to be within one of the three sets. Each set, for instance {four-four, four-three, four-two, three-two, two-two, two-one, one-one}, has seven elements and each element in the set can be assigned with a certain index. If the size of the set of possible antenna structures is denoted by N', Therefore, in this case, ceil(log 2(N')) bits are needed to signal the index in a DCI format (e.g., a new DCI format 2_8).

If the active antenna structure in terms of n1 and n2 is indicated by a DCI format (e.g., a new DCI format 2_8), n1 and n2 can only take values that can result in a possible antenna configuration allowed by the specification. As an example, the following list describes possible values for n1 and n2: (1) n1: sixteen→twelve→eight→six→four-→three→two→one; and (2) n2: four→three→two→one.

Also, for a given antenna structure signaled for the first or the default NW operation state assuming that all the antenna ports are active, the signaled n1 and n2 values cannot be greater than the values signaled for the first or the default NW operation state. If the first and second dimensions of antenna structure indicated to the UE by serving gNB for the first or default NW operation state or the maximum possible first and second dimension of antenna structure allowed by specification are N1 and N2, the n1 and n2 values can be signaled to the UE using a field of ceil(log 2(N1)) bits and a field of ceil($\log_2$(N2)) bits in a DCI format (e.g., a new DCI format 2_8). Alternatively, a ratio of n1, n2, or the product of n1 and n2, compared to N1, N2, or the product of N1 and N2 can be signaled in a DCI format (e.g., a new DCI format 2_8).

As an example, possible values of ratios that can be signaled to a UE in a DCI format can be predefined such as {1, 1/2, 1/4, 1/8}. For instance, if 1/2 is signaled as the ratio of n1 to N1, then the UE assumes that the first half of antennas in the first dimension are active. Similarly, if 1/4 is signaled as the ratio of n2 to N2, then the UE assumes that the first quarter of antennas in the second dimension are active. The indicated ratio may result in a possible antenna configuration allowed by the specification. Otherwise, the UE may disregard the indication. The ratio can also relate to the total number of active antenna ports, i.e., the product of the first and the second dimensions. If 1/4 is signaled as the ratio of n1·n2 to N1·N2, then the UE assumes that the antennas in the first quadrant are active.

When the ratio of the product of the first and the second dimensions of the antenna is signaled, the split of antenna dimension can be predefined, e.g., by specification, such that the UE can assume a proper antenna structure without any confusion. If the size of the set of possible ratio values for the first dimension, the second dimension, or the product of first and second dimensions is Nr, ceil(log$_2$(Nr)) bits are needed to signal a ratio in a DCI format (e.g., a new DCI format 2_8).

Alternatively, only the index among the possible sizes can be signaled in a DCI format (e.g., a new DCI format 2_8) with a smaller number of bits. As an example, as described in the above lists, n1 can take values from the set {sixteen, twelve, eight, six, four, three, two, one} and n2 can take values from the set {four, three, two, one}. If the size of the set of possible n1 values is denoted by N1' and that of n2 values is denoted by N2', ceil(log 2(N1')) bits and ceil(log$_2$(N2')) bits are needed to signal the indices of n1 and n2 values in a DCI format (e.g., a new DCI format 2_8).

Alternatively, a UE can be indicated from the serving gNB by a DCI format (e.g., a new DCI format 2_8) the index of active antenna structure from a set of predefined antenna structures signaled by a higher layer. If there are M predefined antenna structures signaled by a higher layer, the index of active antenna structure can be signaled to the UE using a field of ceil(log$_2$(M)) bits in a DCI format (e.g., a new DCI format 2_8).

Figure 11:
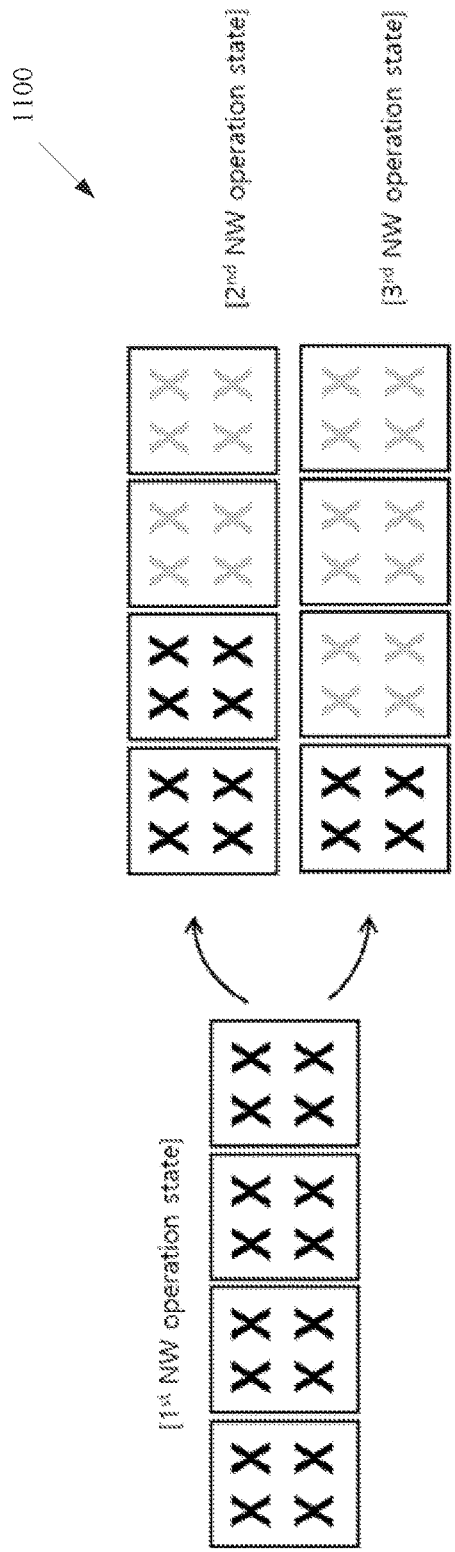
FIG. 11 illustrates an example of spatial domain adaptation hypotheses for CSI feedback via active antenna panel indication according to embodiments of the present disclosure.

FIG. 11 illustrates an example of spatial domain adaptation hypotheses for CSI feedback via active antenna panel indication 1100 according to embodiments of the present disclosure. An embodiment of spatial domain adaptation hypotheses for CSI feedback via active antenna panel indication 1100 shown in FIG. 11 is for illustration only.

In one embodiment, the UE is indicated by a serving gNB the antenna structure when all the antenna panels are turned on and one or multiple antenna structures when a subset of panels are turned off. Such indication may be included in the IE CodebookConfig or in an IE for NW operation state configuration. For Type-I multi-panel codebook, the UE can be signaled from the serving gNB one or multiple ng-n1-n2 indications, each corresponding to different NW operation states, in the typeI-MultiPanel configuration in CodebookConfig along with codebook subset restriction indication.

For the example diagram in FIG. 11, four-two-two-TypeI-MultiPanel-Restriction can be chosen and signaled to the UE for the first NW operation state and two-two-two-TypeI-MultiPanel-Restriction can be chosen and signaled to the UE for the second NW operation state. A third NW operation state corresponding to single panel transmissions can be signaled to the UE using two-two-TypeI-SinglePanel-Restriction. Alternatively, the UE can be indicated by the serving gNB ng-n1-n2 for the first NW operation state, which can be also a default state, and only ng values, i.e., the number of active panels, or the indices of active panels for the other NW operation states. When only the number of active panels, ng, is signalled to the UE, the first ng panels can be assumed to be active unless the UE is separately signalled from the serving gNB an ordering of panels. The UE also assumes that the antenna structure, i.e., n1-n2, signalled for the first or the default NW operation state applies to all the other NW operation states.

For the example diagram in FIG. 11, four-two-two-TypeI-MultiPanel-Restriction can be chosen and signaled to the UE for the first NW operation state, the number of active TRPs, i.e., ng=2, or the indices of active TRPs using bitmap, i.e., {1100}, is signaled to the UE for the second NW operation state, and ng=1 or {1000} is signaled to the UE for the third NW operation state. In such case, the UE may assume that the codebook subset restriction signaled for the first or the default NW operation state applies to all the other NW operation states. Alternatively, one or more of the codebook subset restrictions can be signaled to the UE by the serving gNB for different NW operation states. Similarly, the UE may assume that the rank restriction, ri-Restriction, signaled for the first or the default NW operation state applies to all the other NW operation states, or the serving gNB may separately signal the rank restriction for different NW operation states. In addition, one or more of nrofPorts in CSI-RS-ResourceMapping can be signaled to the UE for different NW operation states. As the UE receives indication on the NW operation state change from the serving gNB, the UE assumes a set of active antenna panels and the corresponding codebook subset and/or rank restrictions according to the parameters for the next NW operation state to transition to.

Alternatively, a UE can be indicated by the serving gNB the antenna configuration, i.e., ng-n1-n2, codebook subset restriction, and/or rank restriction for the first or default NW operation state by a higher layer signalling, and the UE can receive a PDCCH that provides a DCI format (e.g., a new DCI format 2_8) indicating the number of active panels, ng. The UE assumes that the basic panel structure, i.e., n1-n2, codebook subset restriction, and rank restriction signalled from the serving gNB by higher layer signalling for the first or default NW operation state apply when the serving gNB changes the number of active panels via DCI indication. If the number of panels indicated to the UE for the first or the default NW operation state or the maximum possible number of panels that can be indicated to a UE, e.g., set by the specification, is P, the serving gNB can signal the number of active panels, ng, to the UE using a field of ceil(log$_2$(P)) bits in a DCI format (e.g., a new DCI format 2_8).

Alternatively, the serving cell can signal to the UE the indices of active panels using a bitmap of P bits. For example, the corresponding bitmap in the DCI indicates {1111}, {1100}, and {1000} for the first, second, and third NW operation states in FIG. 11, respectively. Alternatively, a UE can be indicated by the serving gNB the antenna configuration, i.e., ng-n1-n2, codebook subset restriction, and/or rank restriction for the first or default NW operation state by a higher layer signalling, and the UE can receive a MAC CE indicating the number of active panels, ng. Alternatively, a UE can be indicated by the serving gNB the antenna configuration, i.e., ng-n1-n2, codebook subset restriction, and/or rank restriction for the first or default NW operation state by MAC CE, and the UE can receive a PDCCH that provides a DCI format (e.g., a new DCI format 2_8) indicating the number of active panels, ng.

For NW operation with a single panel, the UE provides the CSI report to the serving gNB only for the active panel and does not include information related to inter-panel co-phase feedback for codebookMode=1, i.e., $i_{1,4,q}$, and inter-panel and cross-pol co-phase feedback for codebookMode=2, i.e., $i_{2,q}$.

Figure 12:
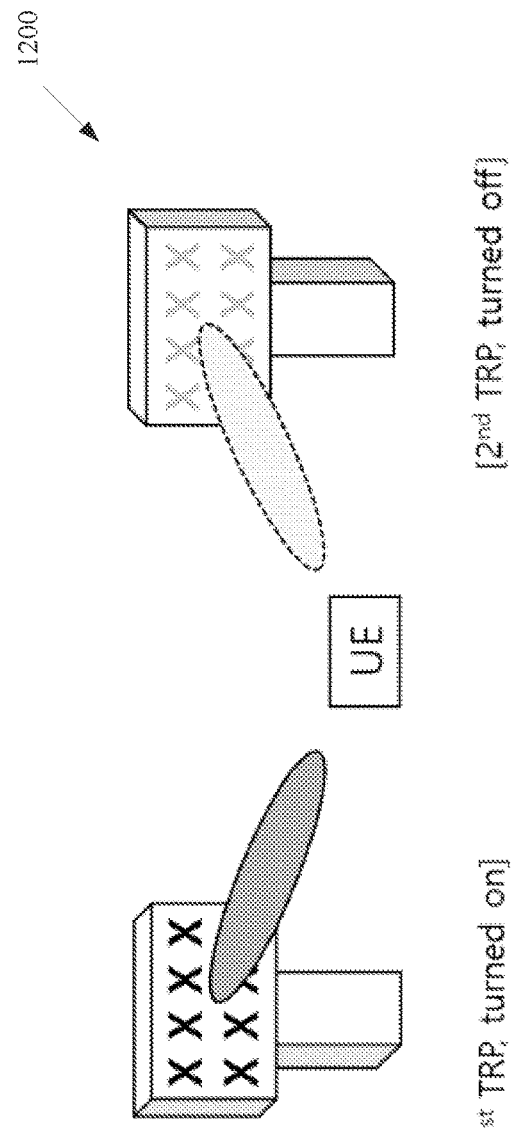
FIG. 12 illustrates an example of spatial domain adaptation hypotheses for CSI feedback via active TRP indication according to embodiments of the present disclosure.

FIG. 12 illustrates an example of spatial domain adaptation hypotheses for CSI feedback via active TRP indication 1200 according to embodiments of the present disclosure. An embodiment of spatial domain adaptation hypotheses for CSI feedback via active TRP indication 1200 shown in FIG. 12 is for illustration only.

FIG. 12 illustrates an example diagram of spatial domain adaptation hypotheses for CSI feedback via active TRP indication for the case of two TRPs. The example in FIG. 12 can be generalized to and similarly understood for cases with more than two TRPs. In a first NW operation state, all TRPs indicated to a UE can be turned on while in a second NW operation state a subset of TRPs can be turned off. The indication to turn on or turn off a TRP for a serving cell can be via an indication for whether a CORESET with a coresetPoolIndex value associated with the TRP is available or unavailable for PDCCH receptions, respectively. In one embodiment, a UE is indicated by the serving gNB the antenna structures for each of the indicated TRPs and a set of active TRPs in the corresponding NW operation states. Such indication may be included in the IE CodebookConfig or in an IE for NW operation state configuration. For Type-I single panel codebook, the UE can be signaled from the serving gNB typeI-SinglePanel1, typeI-SinglePanel2, . . . , typeI-SinglePanelT, where typeI-SinglePanelt includes a set of parameters related to antenna structure, codebook subset restriction, and rank restriction for t-th TRP (t-th coresetPoolIndex value) and T is the total number of TRPs indicated to the UE or the maximum number of TRPs that can be configured to the UE for a serving cell such as for example T=2.

Among the total T TRPs, the UE can be indicated by the serving gNB the number of active TRPs, denoted by nt, a coresetPoolIndex value associated with the TRP, or the indices of active TRPs corresponding to each NW operation state using higher layer signaling or PDCCH that provides a DCI format (e.g., a new DCI format 2_8). As an example, if nt=1 and T=2, the TRP associated with coresetPoolIndex value of 1 is inactive. The number of active TRPs can be indicated using a field of ceil(log$_2$(T)) bits and the indices of active TRPs (coresetPoolIndex values) can be indicated using a bitmap of T bits. In one embodiment, a serving cell itself can be turned on and off according to the NW operation states, which can be indicated to the UE separately from the TRP on/off indication.

If all the TRPs configured to a UE, e.g., via coresetPoolIndex, for a given serving cell are indicated inactive, the UE can assume that the corresponding serving cell itself is inactive. In such case, the number of active TRPs can be indicated using a field of ceil(log$_2$(T+1)) bits and one codepoint is assigned to indicate that all the TRPs are inactive, and consequently the corresponding serving cell is turned off. If a bitmap of T bits is used to indicate the state of T TRPs, the corresponding serving cell is considered inactive if all the bits in the bitmap indicate that all the T TRPs are inactive. For the example diagram in FIG. 12, four-two-TypeI-SinglePanel-Restriction1 can be chosen and signalled to the UE for the first TRP and four-two-TypeI-SinglePanel-Restriction2 can be chosen and signalled to the UE for the second TRP.

If only the first TRP is active in one NW operation state, the number of active TRPs, nt=1, or the indices of active TRPs using a bitmap, i.e., {10}, can be signalled to the UE via a higher layer signal or a DCI format. As the UE receives an indication for the NW operation state change from the serving gNB, the UE assumes the set of active TRPs and the corresponding antenna structure, codebook subset and rank restrictions of the active TRPs according to the parameters for the next NW operation state to transition to.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for a user equipment (UE) to report channel state information (CSI), the method comprising:
   receiving first information related to reception of CSI reference signals (CSI-RSs) on a cell;
   receiving second information related to determining a first number of CSI reports associated with a first number of operation states, respectively, on the cell, wherein an operation state from the first number of operation states is associated with a configuration for a set of active antenna ports, antenna panels, or transmission reception points (TRPs);
   receiving third information related to triggering a second number CSI reports associated with a second number of operation states, respectively, from the first number of operation states;
   receiving the CSI-RSs based on the first information;
   determining, based on the third information, the second number of CSI reports; and
   transmitting a channel with the second number of CSI reports.

2. The method of claim 1, wherein the second information includes indexes of active antenna ports for the reception of the CSI-RSs.

3. The method of claim 1, wherein the second information indicates at least one of:
   a number of antenna ports in a horizontal dimension and a number of antenna ports in a vertical dimension,
   a number or indexes of antenna panels, and
   a number or indexes of TRPs.

4. The method of claim 1, wherein the second information indicates a common codebook type for the first number of operation states on the cell.

5. The method of claim 1, wherein the second information indicates a first number of codebook subset restrictions corresponding to the first number of operation states on the cell.

6. The method of claim 1, wherein the second information indicates a first number of rank restrictions corresponding to the first number of operation states on the cell.

7. The method of claim 1, wherein:
   the third information provides indexes for the second number of operation states; and
   the third information is provided by a downlink control information (DCI) format in a physical downlink control channel (PDCCH) reception or by a medium access control (MAC) control element (MAC CE) in a physical downlink shared channel (PDSCH) reception.

8. A user equipment (UE) comprising:
a transceiver configured to:
receive first information related to reception of channel state information reference signals (CSI-RSs) on a cell,
receive second information related to determining a first number of CSI reports associated with a first number of operation states, respectively, on the cell, wherein an operation state from the first number of operation states is associated with a configuration for a set of active antenna ports, antenna panels, or transmission reception points (TRPs),
receive third information related to triggering a second number of CSI reports associated with a second number of operation states, respectively, from the first number of operation states, and
receive the CSI-RSs based on the first information; and
a processor operably coupled to the transceiver, the processor configured to determine, based on the third information, the second number of CSI reports,
wherein the transceiver is further configured to transmit a channel with the second number of CSI reports.

9. The UE of claim 8, wherein the second information includes indexes of active antenna ports for the reception of the CSI-RSs.

10. The UE of claim 8, wherein the second information indicates at least one of:
a number of antenna ports in a horizontal dimension and a number of antenna ports in a vertical dimension,
a number or indexes of antenna panels, and
a number or indexes of TRPs.

11. The UE of claim 8, wherein the second information indicates a common codebook type for the first number of operation states on the cell.

12. The UE of claim 8, wherein the second information indicates a first number of codebook subset restrictions corresponding to the first number of operation states on the cell.

13. The UE of claim 8, wherein the second information indicates a first number of rank restrictions corresponding to the first number of operation states on the cell.

14. The UE of claim 8, wherein:
the third information provides indexes for the second number of operation states; and
the third information is provided by a downlink control information (DCI) format in a physical downlink control channel (PDCCH) reception or by a medium access control (MAC) control element (MAC CE) in a physical downlink shared channel (PDSCH) reception.

15. A base station comprising:
a transceiver configured to:
transmit first information related to reception of channel state information reference signals (CSI-RSs) on a cell;
transmit second information related to a first number of CSI reports associated with a first number of operation states, respectively, on the cell, wherein an operation state from the first number of operation states is associated with a configuration for a set of active antenna ports, antenna panels, or transmission reception points (TRPs);
transmit third information related to triggering a second number of CSI reports associated with a second number of operation states, respectively, from the first number of operation states;
transmit the CSI-RSs based on the first information; and
receive a channel with the second number of CSI reports,
wherein the second number of CSI reports are based on the third information.

16. The base station of claim 15, wherein the second information includes indexes of active antenna ports for the reception of the CSI-RSs.

17. The base station of claim 15, wherein the second information indicates at least one of:
a number of antenna ports in a horizontal dimension and a number of antenna ports in a vertical dimension,
a number or indexes of antenna panels, and
a number or indexes of TRPs.

18. The base station of claim 15, wherein the second information indicates a common codebook type for the first number of operation states on the cell.

19. The base station of claim 15, wherein the second information indicates a first number of codebook subset restrictions, or a first number of rank restrictions, corresponding to the first number of operation states on the cell.

20. The base station of claim 15, wherein:
the third information provides indexes for the second number of operation states; and
the third information is provided by a downlink control information (DCI) format in a physical downlink control channel (PDCCH) reception or by a medium access control (MAC) control element (MAC CE) in a physical downlink shared channel (PDSCH) reception.

* * * * *